(12) United States Patent
Wang et al.

(10) Patent No.: US 7,244,181 B2
(45) Date of Patent: Jul. 17, 2007

(54) MULTI-PLAYER GAME EMPLOYING DYNAMIC RE-SEQUENCING

(75) Inventors: Andy Wang, Walnut, CA (US); Gabriel Law, West Covina, CA (US)

(73) Assignee: Netamin Communication Corp., Diamond Bar, CA (US)

( * ) Notice: Subject to any disclaimer, the term of this patent is extended or adjusted under 35 U.S.C. 154(b) by 404 days.

(21) Appl. No.: 10/762,935

(22) Filed: Jan. 22, 2004

(65) Prior Publication Data

US 2004/0152519 A1 Aug. 5, 2004

Related U.S. Application Data

(63) Continuation-in-part of application No. 10/002,976, filed on Nov. 14, 2001, now abandoned, which is a continuation-in-part of application No. 09/716,853, filed on Nov. 14, 2000, now abandoned.

(51) Int. Cl.
*A63F 13/00* (2006.01)
(52) U.S. Cl. ........................................................ 463/42
(58) Field of Classification Search ................ 463/1–8, 463/40–42; 700/90–93
See application file for complete search history.

(56) References Cited

U.S. PATENT DOCUMENTS

| | | | |
|---|---|---|---|
| 4,521,014 A | 6/1985 | Sitrick | |
| 4,570,930 A | 2/1986 | Matheson | |
| 4,572,509 A | 2/1986 | Sitrick | |
| 4,738,451 A | 4/1988 | Logg | |
| 5,083,271 A | 1/1992 | Thacher et al. | |
| 5,350,176 A | 9/1994 | Hochstein et al. | |
| 5,359,510 A | 10/1994 | Sabaliauskas | |
| 5,405,151 A | 4/1995 | Naka et al. | |
| 5,538,255 A | 7/1996 | Barker | |
| 5,560,603 A | 10/1996 | Seelig et al. | |
| 5,586,259 A | 12/1996 | Kabe | |
| 5,593,349 A | 1/1997 | Miguel et al. | |
| 5,674,127 A | 10/1997 | Horstmann et al. | |
| 5,685,776 A | 11/1997 | Stambolic et al. | |
| 5,695,400 A | 12/1997 | Fennell, Jr. et al. | |
| 5,775,996 A | 7/1998 | Othmer et al. | |
| 5,779,549 A | 7/1998 | Walker et al. | |
| 5,820,463 A | 10/1998 | O'Callaghan | |
| 5,822,523 A | 10/1998 | Rothschild et al. | |

(Continued)

FOREIGN PATENT DOCUMENTS

WO         WO 00/05854         2/2000

OTHER PUBLICATIONS

Tim Chown, "Premier Manager 97: Gremlin", Games Domain Review, XP-002115838, May 1997.

(Continued)

*Primary Examiner*—Scott Jones
(74) *Attorney, Agent, or Firm*—Stout, Uxa, Buyan & Mullins, LLP

(57) ABSTRACT

A solution for network latency inherent in a multiplayer online game involving more than two players. The solution is a dynamic re-sequencing and synchronization mechanism that enables seamless and simultaneous participation by remote users, such that an event can have an immediate and consequential effect on a related event without the unwanted effects resulting from network latency.

9 Claims, 2 Drawing Sheets

U.S. PATENT DOCUMENTS

| | | | |
|---|---|---|---|
| 5,830,066 A | 11/1998 | Goden et al. |
| 5,838,909 A | 11/1998 | Roy et al. |
| 5,846,132 A | 12/1998 | Junkin |
| 5,855,516 A | 1/1999 | Eiba |
| 5,885,156 A | 3/1999 | Toyohara et al. |
| 5,894,556 A | 4/1999 | Grimm et al. |
| 5,899,810 A | 5/1999 | Smith |
| 5,954,332 A | 9/1999 | Mero et al. |
| 5,956,485 A | 9/1999 | Perlman |
| 5,974,442 A | 10/1999 | Adams |
| 5,984,786 A | 11/1999 | Ehrman |
| 6,006,254 A | 12/1999 | Waters et al. |
| 6,009,458 A | 12/1999 | Hawkins et al. |
| 6,012,096 A | 1/2000 | Link et al. |
| 6,012,984 A | 1/2000 | Roseman |
| 6,018,766 A | 1/2000 | Samuel et al. |
| 6,025,801 A | 2/2000 | Beiter |
| 6,036,601 A | 3/2000 | Heckel |
| 6,042,477 A | 3/2000 | Addink |
| 6,048,271 A | 4/2000 | Barcelou |
| 6,056,640 A | 5/2000 | Schaaij |
| 6,080,063 A * | 6/2000 | Khosla | 463/42 |
| 6,106,399 A | 8/2000 | Baker et al. |
| 6,117,011 A | 9/2000 | Lvov |
| 6,125,386 A | 9/2000 | Cho |
| 6,134,590 A | 10/2000 | Perlman |
| 6,135,881 A | 10/2000 | Abbott et al. |
| 6,152,824 A | 11/2000 | Rothschild et al. |
| 6,183,366 B1 | 2/2001 | Goldberg et al. |
| 6,183,367 B1 | 2/2001 | Kaji et al. |
| 6,196,920 B1 | 3/2001 | Spaur et al. |
| 6,200,216 B1 | 3/2001 | Peppel |
| 6,203,433 B1 | 3/2001 | Kume |
| 6,224,486 B1 | 5/2001 | Walker et al. |
| 6,226,686 B1 | 5/2001 | Rothschild et al. |
| 6,241,612 B1 | 6/2001 | Heredia |
| 6,270,402 B1 | 8/2001 | Fujioka et al. |
| 6,287,199 B1 | 9/2001 | McKeown et al. |
| 6,304,902 B1 | 10/2001 | Black et al. |
| 6,306,036 B1 | 10/2001 | Burns et al. |
| 6,345,297 B1 | 2/2002 | Grimm et al. |
| 6,352,479 B1 | 3/2002 | Sparks, II |
| 6,415,317 B1 | 7/2002 | Yelon et al. |
| 6,475,090 B2 | 11/2002 | Roelofs |
| 6,494,783 B2 | 12/2002 | Namba et al. |
| 6,508,711 B1 | 1/2003 | Ono |
| 6,527,641 B1 | 3/2003 | Sinclair et al. |
| 6,628,287 B1 | 9/2003 | Duda et al. |
| 6,653,545 B2 | 11/2003 | Redmann et al. |
| 6,755,743 B1 | 6/2004 | Yamashita et al. |
| 6,811,487 B2 | 11/2004 | Sengoku |
| 6,845,389 B1 | 1/2005 | Sen et al. |
| 6,885,660 B2 | 4/2005 | Inbar et al. |
| 6,932,708 B2 | 8/2005 | Yamashita et al. |
| 2002/0055385 A1 | 5/2002 | Otsu |
| 2002/0142843 A1 | 10/2002 | Roelofs |
| 2003/0060285 A1 | 3/2003 | Itakura |
| 2003/0177167 A1 | 9/2003 | Levine et al. |
| 2004/0236863 A1 | 11/2004 | Shen et al. |

OTHER PUBLICATIONS

Playguide for Ultima Online Renaissance, PCGAME REVIEW. COM, retrieved May 2, 2002.

* cited by examiner

MULTI-PLAYER GAME EMPLOYING DYNAMIC RE-SEQUENCING

CROSS-REFERENCE TO RELATED APPLICATIONS

This application is a continuation-in-part of application Ser. No. 10/002,976, filed Nov. 14, 2001, now abandoned, which is a continuation-in-part of application Ser. No. 09/716,853, filed Nov. 14, 2000, now abandoned. This application expressly incorporates by reference the entirety of each of the above-referenced applications as if fully set forth herein.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

With the rise of the popularity of the Internet, many forms of digital entertainment have crossed over from their traditional distribution medium to that of Internet. One notable example is radio broadcasting, where technology in the past decade has enabled listeners from around the world with access to the Internet to select the desired content and hear radio programs from their personal computers. While digital entertainment such as radio broadcasting has gained popularity, the genre is limited in the sense that the action is uni-directional, i.e. entertainment content flowing in one direction only from the provider to the users. Although this is convenient, the format does not fit well with the intrinsic nature of the Internet, which always has involved a high degree of interaction. The most basic example of a bi-directional form of communication with respect to the Internet is the interaction of users in clicking a link on a page in the World Wide Web to select content to be viewed.

Interactive online digital entertainment has gained ground on many fronts in recent years, especially with respect to video gaming. For example, users can login to certain websites to first find an opponent and then play a game of chess in the virtual world. As a human player will be competing against another human player, the form of communication is bi-directional. However, not all video games can be played online. For a game of chess where time to make a move does not have an immediate and consequential effect on the outcome (also called a twitch game), players obviously have ample time to contemplate the next move, counter-move, game strategy and so on. However, in a majority of real-time video games, time needed to make a decision and act upon that decision is relatively short so that players involved feel a sense of realism. In such a real-time game, action must occur in close proximity in every aspect thereof to real life events. Real-time action is a must for the action genre (e.g., fighting games), simulation genre (e.g., flight simulators) and sport genre (e.g., baseball games).

With respect to video games played by a single player (either on a console or personal computer (PC)), the video game program determines how best to mimic real life. On the other hand, with respect to games played over the Internet, game programmers must consider network latency that will delay an action, or, in a multiplayer setting, display a different progression of the same game to players based on a variety of criteria. The time difference of the display to respectively different players can be extremely small, perhaps no more than 500 ms (equivalent to approximately one half of a second), which may seem like a relatively insignificant passage of time; however, in a real-time game such a time difference may be determinative of game outcomes.

Network latency involves the time needed for packets of data (e.g., the information related to a character's action) to travel from a user's computer to the game server and then from the game server to the rest of the users. Ideally, if all users have the same network latency, there would be no issue as all events would just be delayed by the same amount of time. However, due to different geographical locations, as well as quality of Internet connection services, each user is likely to have a different latency. Thus, each user would be looking at a different point in time in the game, which would prevent crucial judgments (e.g., determining at a given moment the right strategy to defend an offensive play in a football game) from taking place and thereby would effectively eliminate the realism in the game.

Network latency has been addressed, for example, in U.S. Pat. No. 5,695,400 to Fennell, Jr. et al.; U.S. Pat. No. 5,775,996 to Othmer et al.; U.S. Pat. No. 5,820,463 to O'Callaghan; U.S. Pat. No. 5,838,909 to Roy et al.; U.S. Pat. No. 5,899,810 to Smith; U.S. Pat. No. 5,974,442 to Adams; U.S. Pat. No. 6,006,254 to Waters et al.; U.S. Pat. No. 6,012,096 to Link et al.; U.S. Pat. No. 6,025,801 to Beitel; U.S. Pat. No. 6,042,477 to Addink; U.S. Pat. No. 6,304,902 to Black et al.; U.S. Pat. No. 6,345,297 to Grimm et al.; U.S. Pat. No. 6,415,317 to Yelon et al.; U.S. Pat. No. 6,475,090 to Roelofs; each of which is incorporated herein by reference in its entirety.

FIG. 1 illustrates the conventional way to compensate for network latency, in which the main idea is to build in a buffer where everyone is delayed by a set amount of time (in this case 500 milliseconds (ms)) minus the respective network latency time before any action occurs on the screen. More particularly, in the prior art network latency solutions, an intentional delay is built into the game so that each player of the game sees the start of the motion at the same time. During the game or when players log in, the server detects an average ping time for each player (ping time is defined herein as the time required for a packet of data to travel from a player's computer to a predetermined server, which in this case would be a game server). Typically, if the ping time is above 400 ms, the player will not enjoy a smooth game due to the fact that the player's response to other player's actions will always be late.

Referring now to FIG. 1, the default allowance is 500 ms, player X has an average ping time of 300 ms and player Y has an average ping time of 100 ms. Player X initiates an action (throwing a ball) by clicking his mouse at t=0 ms. Player Y is the intended receiver of the ball thrown by player X. The server receives the signal from player X at t=300 ms (note that other players in the game do not at this instant know that X has initiated the throwing action). The server then calculates the difference between the player's average ping time and the default allowance, thus in this case 500 ms−300 ms=200 ms, which is the value of the intentional buffer. The server sends signals to other players in the game at t=300 ms, including player Y who has a player-specific buffer of 100 ms. The server then calculates the intentional buffer for Y (500 ms−100 ms=400 ms). Thus, as shown in FIG. 1, 800 ms elapses before both X and Y see that the ball is thrown. The timeline described above can be summarized as follows:

t=0 ms [X clicks mouse to initiate action]
t=300 ms [Server receives signal from X]
t=400 ms (300+100) [Y receives signal from server that X has initiated action and that the action will be shown 400 ms later]
t=600 ms (300+300) [X receives signal from server that action will be shown 200 ms later]
t=800 ms (300+100+400 or 300+300+200) [both X and Y see the throwing action]

The above-described process is complicated tremendously if the network latency of player X is higher than a certain threshold, say, 500 ms. In such a case, the whole solution would be rendered useless because the delay in the action would be too great (i.e., more than 1 second). Thus, various methods have been proposed to address this problem.

For example, U.S. Pat. No. 6,475,090 to Roelofs is directed to in-game factors to compensate for network latency. A method is provided for compensating for high-latency computer clients in a multi-player electronic game played on a plurality of terminals connected by a network. A latency value is determined for computer clients operating the terminals, after which a latency compensation factor is determined from the latency value for each client computer. The playing modality of a client computer can then be adjusted based on the latency compensation factor. The compensation techniques are applied during the playing of the game time via the previously constructed latency compensation curve. For example, a compensation curve may be employed whereby a player would be afforded a compensation mechanism commensurate with his measured latency. The compensation may, for example, provide the player with an increase in speed to enable him to compensate for his delay. There is, however, no buffering involved.

U.S. Pat. No. 6,304,902 to Black et al. is directed to a method and system for determining network latency between clients in a computer network having at least two clients connected thereto in a manner that reduces network traffic at any given time. Each client determines the network latency between each other client via a ping, response, and response-response protocol. To this end, a first client places first time information such as a time stamp into a (ping) data packet and sends the packet to the second client, who places second time information into the packet and sends the packet as a response packet back to the first client. The first client determines a first network latency based on its current time and the first time information returned in the response packet. The first client then sends the packet back to the second client as a response to the response packet. The second client determines a second latency based on the current time information at the second client and the second time information received in the response-response packet. For multiple clients such as in a gaming zone environment, each local client sorts the IP addresses of the other remote clients into sets of clients, and pings the remote client or clients in each set once per predetermined period, thereby distributing the pinging operation to balance incoming and outgoing network traffic. More particularly, this solution matches players in proximity (and thereby lower network latency) to play each other, thus exempting the possibility that network latency may affect gameplay during the game. However, this method only allows peer-to-peer (where action information in the form of data packets are sent from one player to other player(s)), not server/client, matches to take place.

Importantly, the above-described solutions do not permit a potential third party to intervene in the gameplay. Team sport games such as baseball, American football, soccer, ice hockey and basketball, for example, by their nature require multiple players to engage in possession of the game ball. While the aforementioned solutions address compensating network latency, the pertinent architecture focuses on one-on-one gameplay. The particular problem related to a multiplayer game having a TCP/IP server/client structure (in contrast to peer-to-peer structure), in which a solution to latency compensation (due to an event that has an immediate and consequential effect on another (or next) event) is required, has heretofore yet to be provided.

Thus, with respect to multiplayer online games involving simultaneous participation of users positioned at different locations (i.e., users distanced remotely from one another, perhaps even in different countries), wherein the structure is TCP/IP server/client, there exists a need for an invention that can effectively overcome problems posed by network latency.

BRIEF SUMMARY OF THE INVENTION

Accordingly, a primary object of the present invention is to provide a massively multiplayer online game with a mechanism that enables seamless and simultaneous participation by remote users, such that an event can have an immediate and consequential effect on a related event without the unwanted effects of delay and desynchronized events resulting from network latency. For purposes of the invention described herein, the term "dynamic re-sequencing" refers to such a mechanism. It is also an object of the present invention to provide a method to synchronize the game following dynamic re-sequencing thereof.

What is claimed is a method of compensating for network latency in an online multiplayer game requiring more than two participants, wherein the client structure of said game utilizes at least one server, comprising the steps of qualifying all participants in the game as members of either an active group or an awaiting group, qualifying a member of said active group as an initiator, qualifying at least one member of said active group as an intended receiver, qualifying at least one member of said active group as an interceptor, conveying an action initiated by said initiator and directed to said intended receiver first to said interceptor, wherein said interceptor has the initial opportunity to react to said action, and wherein a reaction by said interceptor results in an outcome signal, and conveying said outcome signal to each of said initiator, intended receiver and interceptor at a specific time for each, wherein each will witness the reaction concurrently.

DETAILED DESCRIPTION OF THE INVENTION

Figure 1:
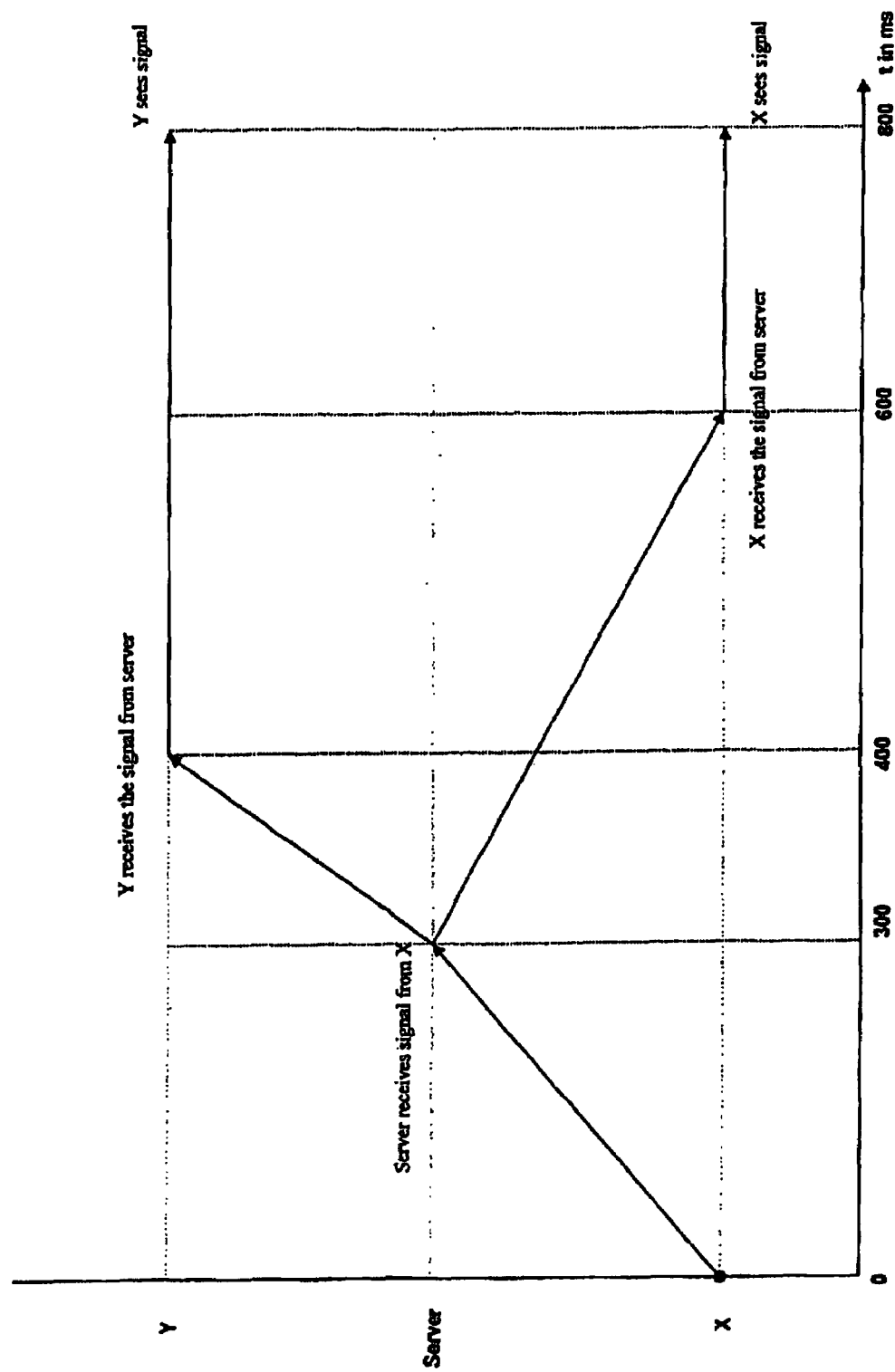
FIG. 1 is a graphical description on traditional way of overcoming internet latency.

The following detailed description should be read with reference to the drawings, in which like elements in different drawings are identically numbered. The drawings, which are not necessarily to scale, depict selected preferred embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

In order to describe the present invention, examples are provided with respect to a typical multiplayer online game. In these examples, users are represented in a virtual reality as their own avatars, or characters. Each character is assigned a particular designation based on his or her involvement in the game at a given point in time. Character designations are reassigned continuously throughout the game, depending on various qualifying factors, which will be described in more detail below. The terms "designating," "assigning" and "qualifying" are used interchangeably herein to describe the mechanism for which a character is placed into a certain group and/or becomes an active participant in a game event such that the dynamic re-sequencing and synchronizing solutions of the present invention can be adequately conveyed. Also, in the examples herein, the actual human participants in the game may be referred to with respect to the characters they control within the game.

In one example showing how the present solution to network latency is implemented, all characters on a given playing field are divided into one of two groups: an action group and an awaiting group. The action group comprises an initiator, an intended receiver and potential interceptor(s). The initiator is usually in possession of a game object (i.e., a ball), and an action initiated by the initiator is a game event. An interceptor may attempt to capture the game object and although he may not actually gain possession thereof, he would have a chance to alter the outcome of what the initiator wants to achieve (e.g., to pass the ball to another teammate), which for purposes of this example will be called the goal. The intended receiver is on the receiving end of this goal and, in some cases, there can be more than one intended receiver. Characters in the awaiting group would queue up according to a predetermined, game-specific formula that qualifies them in a specific order to replace and assume the role of intended receiver and/or interceptor. The qualification process takes place recurrently in very short intervals, and a new goal is established once the result of the previous goal is determined.

In basic terms, the present invention allows the interceptor to witness a game event a few milliseconds before the rest of the characters on field witness the beginning of said event, the interceptor being sequenced to react initially to said game event. Such an arrangement allows the interceptor to determine at a slightly earlier time whether the outcome of the goal is to be altered. In the event that the interceptor has not altered the initiator's goal, the intended receiver will have the next chance to act upon the goal and determine its outcome. At that instance, if another character from the awaiting group can qualify as an intended receiver, then the role of the original intended receiver will immediately change to that of one in the awaiting group, who may qualify as an interceptor. In another scenario, a character in the awaiting group can qualify as the interceptor, while the role of intended receiver remains the same. The determining factors of whether a character qualifies as one of the three members of the action group include, for example, distance to the event, performance aspects of the characters (such as speed), rules specific to the position the character is playing related to the sport and/or video game (e.g., a defensive lineman in an American football game would be unlikely to intercept a pass), network latency effects, hardware limitations, etc. It is worth noting that members from either team in a two-team game can be in the same pool of characters in the awaiting group. As characters are constantly making plays on the field, characters in the awaiting group will have ample chances to become either an intended receiver or an interceptor, and if intercepted successfully, become an initiator.

Thus, the game must dynamically sequence which characters can become an interceptor and thereby witness a game event earlier than the other characters. Rules for determining the sequencing can originate from either the rules with respect to the game being simulated (such as a pass interference penalty in American football) or video game specific rules (such as only characters possessing certain traits can successfully complete certain action in time). Following are examples of different games in which the dynamic re-sequencing of the present invention is utilized.

In a first example, characters engage in a baseball game, in which the most time-sensitive sequence of event occurs between the batter and the catcher. In this scenario, the pitcher is the initiator, the batter the interceptor and the catcher the intended receiver. The goal is to deliver the pitch safely to the catcher, while avoiding a hit by the batter. In real life, only a small fraction of a second will elapse when the ball travels past the batter (i.e., the batter does not make contact with the ball), which cannot be mimicked in an online multiplayer game realistically due to network latency. As explained above, the present invention allows the batter (interceptor) to see the pitch a split second before the rest of the characters do. Once the batter decides whether to swing the bat or not in response to the location of the ball, the outcome is determined and the rest of the characters, including the catcher, will know what the result is and take the appropriate action(s). The qualifications required to become an interceptor in this embodiment would be the rules of the game of baseball in that the batter is trying to hit a pitch delivered from the pitcher to the catcher.

In a second example, characters engage in a soccer game, in which a player (an initiator who has possession of a soccer ball) is trying to pass the ball to a teammate (an intended receiver) while an opponent is trying to intercept the pass (the interceptor). Once the system determines the opponent player is qualified (perhaps due to the fact that he is stationed at the moment in the vicinity of the soccer ball), the character is allowed to see the action of the soccer ball moving from the initiator along a path to the intended receiver. Depending on his response to this pass, the virtual distance between the character and the ball, the character's speed and the user's ability to control the character, the interceptor may change the outcome. If he does, he assumes the role of the initiator. The qualifications required to become an interceptor in this scenario are firstly in-game factors (i.e., the distance to the soccer ball) and secondly the character's performance traits (i.e., that he is speedy enough to intercept).

In a third example, characters engage in an American football game, in which a quarterback is making a throw to an intended receiver with three defenders nearby. By video game rules, only a maximum of two defensive players may approach the intended receiver. Thus, for example, the furthest character from the ball (or the slower of the characters) will not be involved in the play. Of the two remaining defensive players, video game rules dictate that the closest defensive character will have a chance to try to intercept the ball first; if he fails, the remaining defensive character will have a chance. Therefore, the first defensive player will see the pass a split second before the rest of the characters, and then the second defensive player will see the pass, followed by the intended receiver. The qualification required to become an interceptor in this scenario is in-game factors.

Intuitively, it is relatively easy to determine which player/character qualifies as the initiator and the intended receiver; however, the role of an interceptor is harder to assign because each character participating in the game should theoretically have an opportunity to intercept the object. Upon closer analysis, several rules determine whether a participant can qualify as an interceptor, three of which are explained in more detail below. It should be appreciated, however, that there are countless possible rules that could determine whether a player would qualify as an interceptor and therefore, the below list should not be construed as an exclusive list.

Sport game rules: Characters playing certain defined positions on a team in a given sports game assume the role of being the potential interceptor. In the game of baseball, for example, the batter acts as an interceptor. It is important to note, however, that the present invention intends to address the event that has an immediate and consequential effect on the next event, so that the interceptor may not need to gain possession of the ball. Instead, the player merely needs to decide how his action will affect the next event. For example, a base runner may also act as an interceptor between an outfielder and an infielder; while the base runner would not actually gain possession of the ball, his action (whether or not safely reaching a base) has an immediate and consequential effect on whether the infielder will attempt to throw to another base in order to record an additional out.

Character parameters: Every character has a set of parameters that determine how the avatar will perform. For example, in American football, in a passing situation, the cornerback should be able to intercept an action; however, if the cornerback character does not match up in speed to that of the intended receiver, he should be disqualified. Note that such an action is generated not purely from football rules, but from game design specific rules in the video game. Other examples of parameters include dexterity, agility and balance.

In-game situations: Even if the player's position is consistent with the rules of the game and the parameters meet the minimum requirement, the potential interceptor must be in a physical position possible to make the interception or impose an immediate and consequential effect on the next event. The player must be in proximity of the intiator, for example, and the player must not be impeded by an obstacle. For example, in a game of soccer, a teammate in possession of the game ball would be the initiator, while almost any of his teammates could be qualified as the intended receiver. Should the initiator attempt to pass the ball to another teammate, an opponent would have the chance to intercept if he is near the ball and is not blocked from the initiator by another player.

Figure 2:
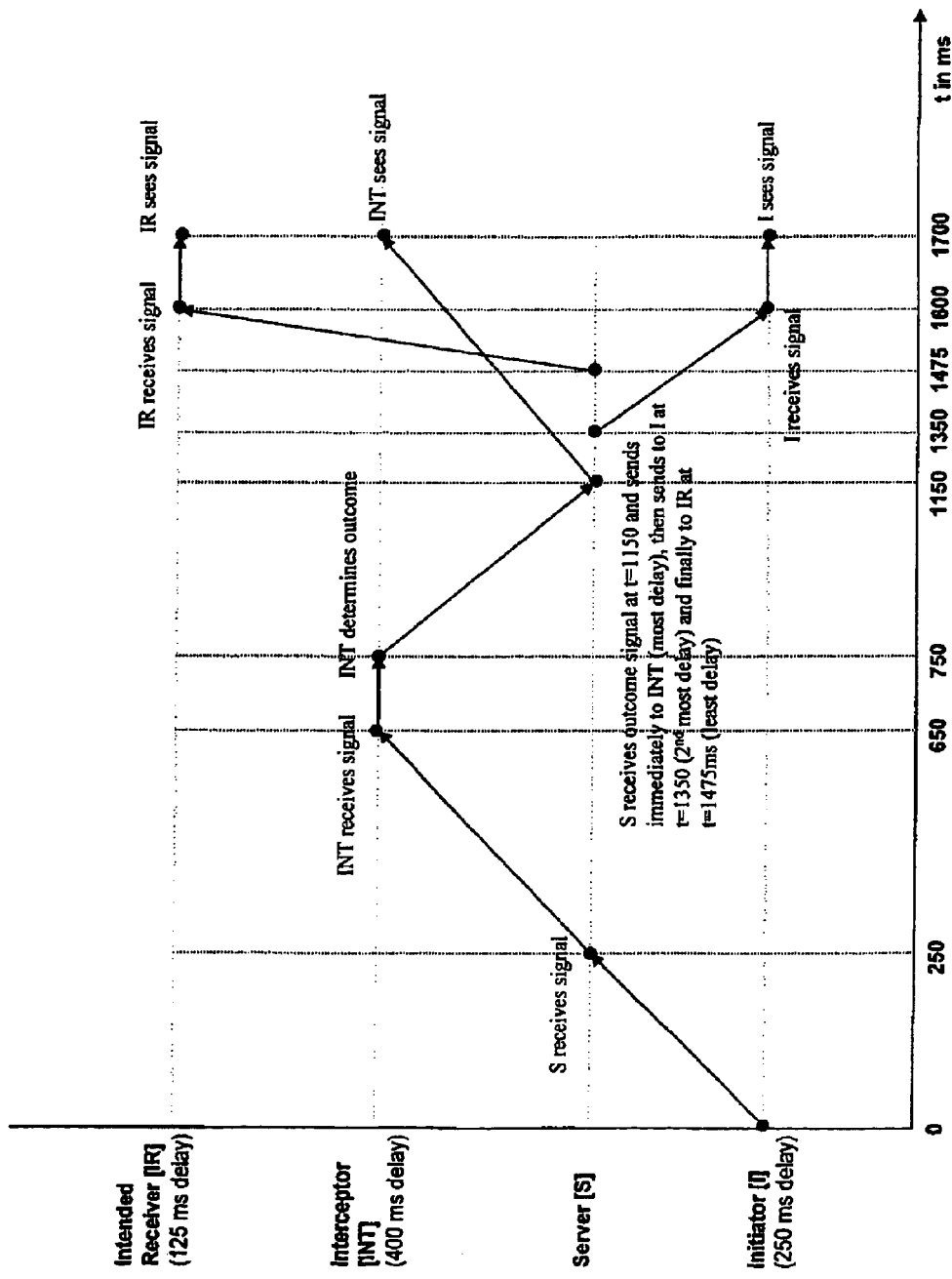
FIG. 2 is a graphical description on how this invention overcomes internet latency.

Summarizing, the primary thrust of the present invention is to provide a network latency solution by sequencing events and allowing an interceptor the opportunity to determine the outcome before the initiator or the intended receiver. With reference to FIG. 2, a further example is provided to explain how the present invention overcomes network latency. In this example, the game is an online baseball game, the details of which can be found in predecessor U.S. patent application Ser. Nos. 10/002,976, and 09/716,853, incorporated by reference herein, which describe the novel action that the solutions detailed herein permit.

The initiator in this example is a pitcher, having a 250 ms delay, the intended receiver is a catcher, having a 125 ms delay, and the interceptor is a batter, having a 400 ms delay. The pitcher begins a given action by initiating a pitch. The server receives the signal of the pitch at t=250 ms and transmits only to the batter at t=650 ms. As explained above, the batter (interceptor) is permitted a brief moment to view the event and react thereto, in this case, several milliseconds, prior to the other players. If the batter succeeds in intercepting the object (i.e., making contact with the ball), he may experience a brief period of delay between the end of the event and the beginning of the next event so that all players can be synchronized to see the outcome of the event at the same time. Thus, the batter may spend a few milliseconds dropping his bat and preparing to run to first base. At this point, the next interceptor will be determined.

Referring to FIG. 2, the batter succeeds in hitting the ball at t=750 ms. The server receives the outcome signal (i.e., ball being hit) at t=1150 ms and immediately sends the signal to the batter, who sees the batted ball at t=1700 ms. The pitcher, on the other hand, doesn't see the pitch delivered until t=1600, but then immediately sees the outcome signal also at t=1700 ms. The catcher, like the pitcher, sees the pitch delivered at t=1600 ms, and sees the outcome signal at t=1700 ms. It should be noted that although the pitcher (initiator), catcher (intended receiver) and batter (interceptor) in this example witness the outcome signal at the same time, the actual time at which the server conveys the outcome signal to each may be different. Thus, the outcome signal contains within it an instruction with respect to when to display the outcome signal, so that each player witnesses the event at the same time.

The present invention has been described above in terms of certain preferred embodiments so that an understanding of the present invention can be conveyed. However, there are many alternative arrangements for dynamic re-sequencing not specifically described herein, but with which the present invention is applicable. Although specific features have been provided, dynamic re-sequencing in the present invention would equally be embodied by other configurations not specifically recited herein. The scope of the present invention should therefore not be limited by the embodiments illustrated, but rather it should be understood that the present invention has wide applicability with respect to online multiplayer games generally. All modifications, variations, or equivalent elements and implementations that are within the scope of the appended claims should therefore be considered within the scope of the invention.

What is claimed as new and desired to be protected by Letters Patent of the United States is:

1. A method of compensating for network latency in an online multiplayer game requiting more than two participants, wherein the client structure of said game utilizes at least one server, comprising the steps of:
   qualifying all participants in the game as members of either an active group or an awaiting group;
   qualifying a member of said active group as an initiator;
   qualifying at least one member of said active group as an intended receiver;
   qualifying at least one member of said active group as an interceptor;
   conveying an occurrence of an action, which is initiated by said initiator and directed to said intended receiver, first to said interceptor, wherein said interceptor becomes aware of said action first and has the initial opportunity to react to said action, and wherein a reaction by said interceptor results in an outcome signal; and conveying said outcome signal to each of said initiator, intended receiver and interceptor at a specific time for each, wherein each of said initiator, intended receiver and interceptor will witness the reaction concurrently.

2. The method according to claim 1, wherein said outcome signal comprises instructions regarding the time to display said reaction.

3. The method according to claim 1, wherein said intended receiver has the initial opportunity to react to said reaction.

4. The method according to claim 1, wherein said step of qualifying an initiator comprises the step of determining which participant is in possession of a game object.

5. The method according to claim 1, wherein said step of qualifying at least one member as an intended receiver comprises the step of determining to which participant said initiator is attempting to convey a game object.

6. The method according to claim 3, wherein said step of qualifying at least one member as an interceptor comprises taking into account one or more of: established rules of said game, particular participant parameters defined by said game, and in-game situations.

7. The method according to claim 1, wherein members of said awaiting group are qualified as members of said active group according to a pre-determined, game-specific formula.

8. The method according to claim 1, wherein said game comprises at least two teams, and wherein said initiator and said intended receiver are on the same team.

9. The method according to claim 1, wherein the conveying of an occurrence of an action comprises conveying a display of an occurrence of an action.

* * * * *